US007795765B2

(12) United States Patent
Oohashi et al.

(10) Patent No.: US 7,795,765 B2
(45) Date of Patent: Sep. 14, 2010

(54) AUTOMOTIVE ALTERNATOR

(75) Inventors: Atsushi Oohashi, Tokyo (JP); Shinichi Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 11/950,049

(22) Filed: Dec. 4, 2007

(65) Prior Publication Data

US 2008/0290763 A1 Nov. 27, 2008

(30) Foreign Application Priority Data

May 22, 2007 (JP) ............................ 2007-134887

(51) Int. Cl.
*H05K 7/20* (2006.01)

(52) U.S. Cl. ......................... 310/64; 310/68 D; 310/58; 310/59; 336/141

(58) Field of Classification Search ............... 310/68 R, 310/68 D, 59, 58, 64; 363/141
See application file for complete search history.

(56) References Cited

U.S. PATENT DOCUMENTS 5,258,673 A * 11/1993 Gotoh ...................... 310/68 D
2004/0182542 A1* 9/2004 Take et al. ................. 165/80.3
2007/0102931 A1 5/2007 Oohashi

FOREIGN PATENT DOCUMENTS

JP 2002-142423 A 5/2002
JP 2002-142424 A 5/2002
JP 2005-012886 A 1/2005
WO WO 2006/048930 A1 * 4/2004

* cited by examiner

*Primary Examiner*—Quyen Leung
*Assistant Examiner*—Terrance Kenerly
(74) *Attorney, Agent, or Firm*—Sughrue Mion, PLLC

(57) ABSTRACT

A circuit board heatsink 60 for cooling a regulator circuit board has a flat base portion 61. Fifteen fins 62 are respectively disposed so as to project vertically from a first surface of the base portion and are arranged so as to be parallel to each other. The regulator circuit board is fixed to a second surface of the base portion 61 of the circuit board heatsink 60, and is housed and held inside a regulator circuit board housing portion of a regulator assembly such that the fins 62 face the rear bracket.

10 Claims, 9 Drawing Sheets

40
10
14
44
42
43
41
15a
60
15
62
27
21
29

AUTOMOTIVE ALTERNATOR

BACKGROUND OF THE INVENTION

1. Field of the Invention

The present invention relates to an automotive alternator and particularly relates to a fin construction of a heatsink to which a regulator circuit board is mounted.

2. Description of the Related Art

In conventional automotive alternators, regulator circuit boards have been fixed to a rear surface of a base portion of a heatsink and have been housed and held in a regulator circuit board housing portion of a regulator assembly (see Patent Literature 1, for example).

Patent Literature 1: Japanese Patent Laid-Open No. 2002-142423 (Gazette)

In heatsinks in conventional automotive alternators, because the number of fins that are formed on a base portion front surface is ten, heat radiating area has been small and sufficient radiating could not be performed, making cooling efficiency poor. Because fin spacing at a central portion in a direction of fin arrangement has also been wide, heat radiating area is reduced proportionately, making cooling poor.

SUMMARY OF THE INVENTION

The present invention aims to solve the above problems and an object of the present invention is to provide an automotive alternator that can achieve improved cooling by setting fins so as to be within a range from fourteen to sixteen in number so as to increase heat radiating area without excessively reducing air channel cross-sectional area.

In order to achieve the above object, an automotive alternator of the present invention includes: a rotor that is fixed to a rotating shaft; a front bracket and a rear bracket that rotatably support the rotating shaft and that envelop the rotor; a stator that is held by the front bracket and the rear bracket and that surrounds the rotor; and a rectifier that is mounted to the rear bracket so as to be disposed around the rotating shaft in an approximate C shape and that rectifies alternating-current output that is generated by the stator into direct current. The automotive alternator further includes a regulator assembly that has: a brush holder portion that is disposed so as to face the rotor such that an aperture direction of a brush insertion aperture is aligned in a radial direction and that holds a brush inside the brush insertion aperture; and a base into which a regulator circuit board housing portion that is disposed such that a resin injection aperture faces radially outward is molded integrally into the brush holder portion near the rear bracket, the regulator assembly being mounted to the rear bracket such that the base is disposed between two end portions of the approximate C shape of the rectifier. The automotive alternator further includes; a heat sink that has: a flat base portion; and a plurality of fins that are respectively disposed so as to project vertically from a first surface of the base portion and that are arranged so as to be parallel to each other; and a regulator circuit board that is fixed to a second surface of the base portion of the heatsink, that is housed and held inside the regulator circuit board housing portion such that the fins face the rear bracket, and that adjusts magnitude of an alternating-current voltage that is generated by the stator. the fins that are formed on the first surface of the base portion are within a range from fourteen to sixteen in number.

According to the present invention, because the fins are within a range from fourteen to sixteen in number, heat radiating area can be increased without reducing air channel cross-sectional area excessively, enabling improved cooling to be achieved.

DETAILED DESCRIPTION OF THE PREFERRED EMBODIMENT

Figure 1:
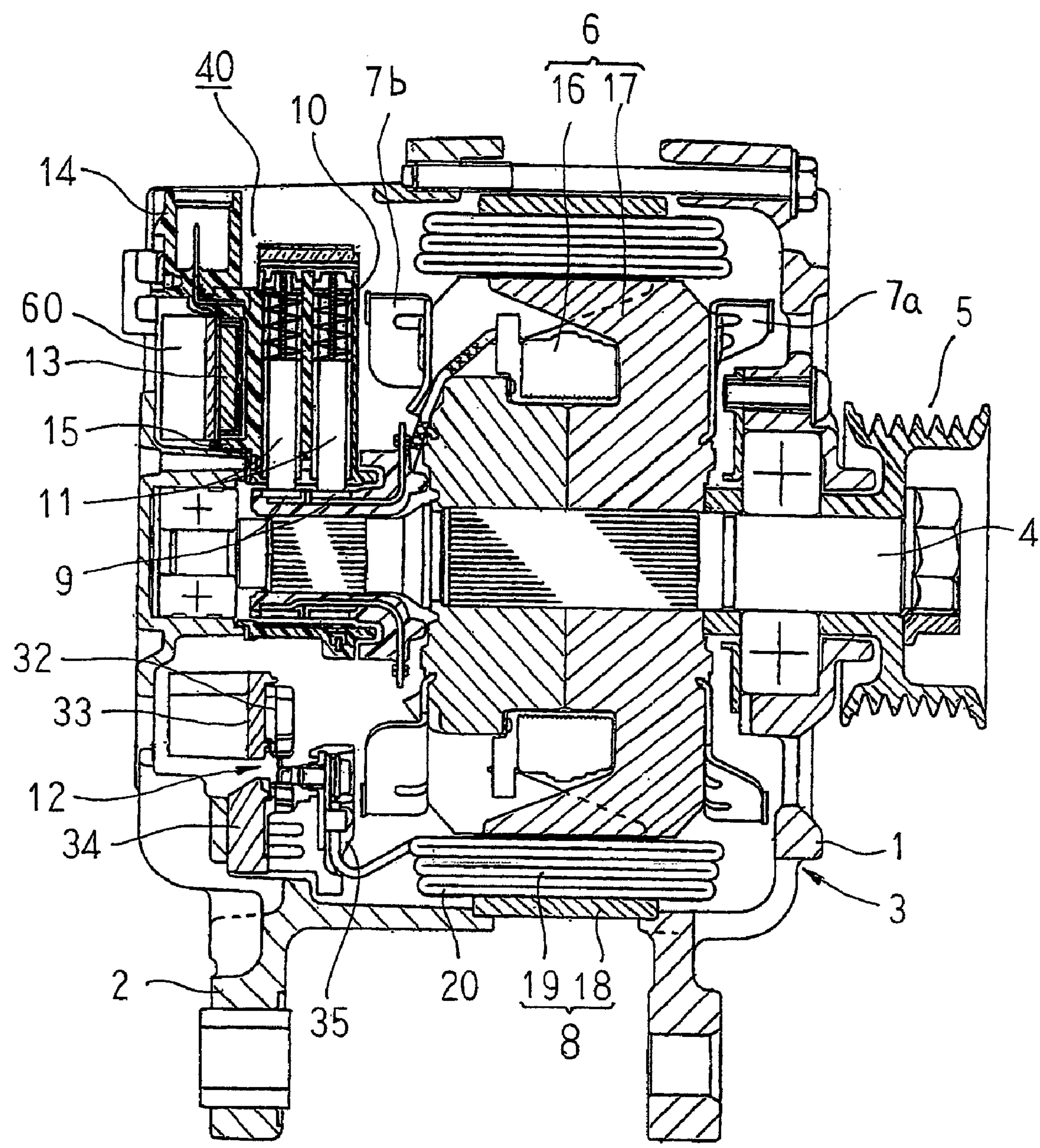
FIG. 1 is a cross section of an overall configuration of an automotive alternator according to a preferred embodiment of the present invention.

FIG. 1 is a cross section of an overall configuration of an automotive alternator according to a preferred embodiment of the present invention.

In FIG. 1, an automotive alternator includes: a case 3 that is constituted by a front bracket 1 and a rear bracket 2 that are each approximately bowl-shaped and made of aluminum; a rotating shaft 4 that is rotatably supported at a central axial position of the case 3; a pulley 5 that is fixed to a first end of the rotating shaft 4 that projects outward at a front end of the case 3; a claw-pole rotor 6 that is fixed to the rotating shaft 4 so as to be rotatably disposed inside the case 3; a stator 8 that is held by an inner wall surface of the case 3 so as to surround the rotor 6; a pair of slip rings 9 that are fixed to a second end portion of the rotating shaft 4 so as to supply electric current to a rotor coil 16 of the rotor 6; a brush holder portion 10 that is disposed radially outside the slip rings 9; brushes 11 that are disposed inside the brush holder portion 10 so as to slide in contact with the respective slip rings 9; a rectifier 12 that is electrically connected to a stator coil 19 of the stator 8 so as to rectify alternating current that is generated in the stator coil 19 into direct current; a regulator circuit board 13 that adjusts magnitude of alternating voltage that is generated in the stator coil 19; and a connector portion 14 to which an external connector can be mounted.

The rotor 6 has: a rotor coil 16 that generates magnetic flux on passage of electric current; and a pole core 17 that is disposed so as to cover the rotor coil 16 and in which magnetic poles are formed by the magnetic flux. The rotating shaft 4 is inserted through a central axial position of the pole core 17 and fixed. Front and rear cooling fans 7*a* and 7*b* are fixed to two axial end surfaces of the pole core 17.

The stator 8 includes: a stator core 18 that is held between the front bracket 1 and the rear bracket 2 and that is disposed so as to surround the rotor 6; and a stator coil 19 that is mounted to the stator core 18. The stator coil 19 is prepared by installing conductor wires in slots of the stator core 18. The conductor wires extend outward from the slots of the stator core 18 at two axial ends of the stator core 18 to constitute coil ends 20. Portions of the conductor wires that are housed inside the slots of the stator core 18 are formed so as to have rectangular cross sections. Here, a rotating magnetic field is applied to the stator coil 19 by rotation of the rotor 6, generating electromotive force in the stator coil 19.

Figure 2:
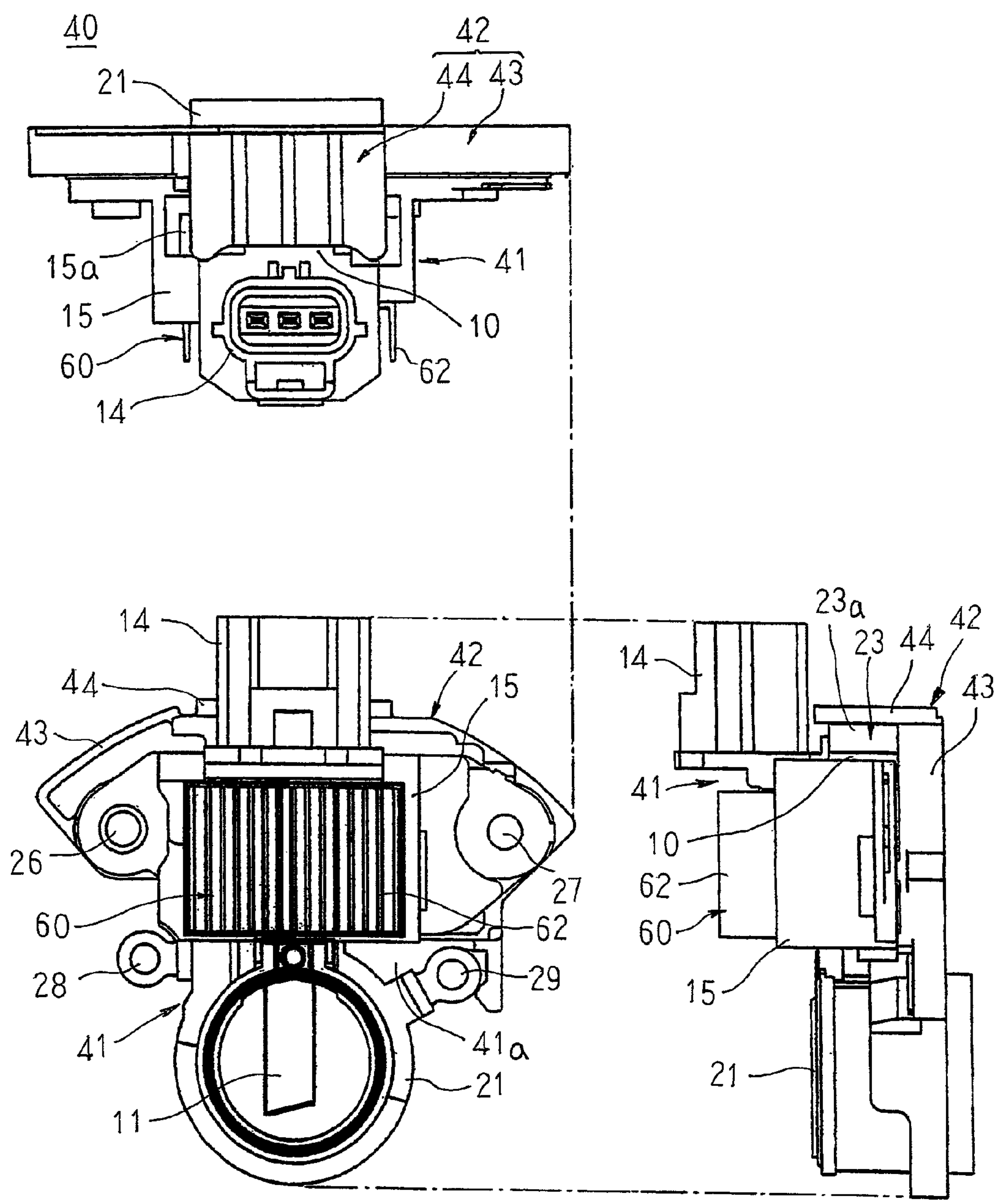
FIG. 2 is a front elevation, a top plan and a right side elevation of a regulator assembly that can be used in the automotive alternator according to the preferred embodiment of the present invention.
Figure 3:
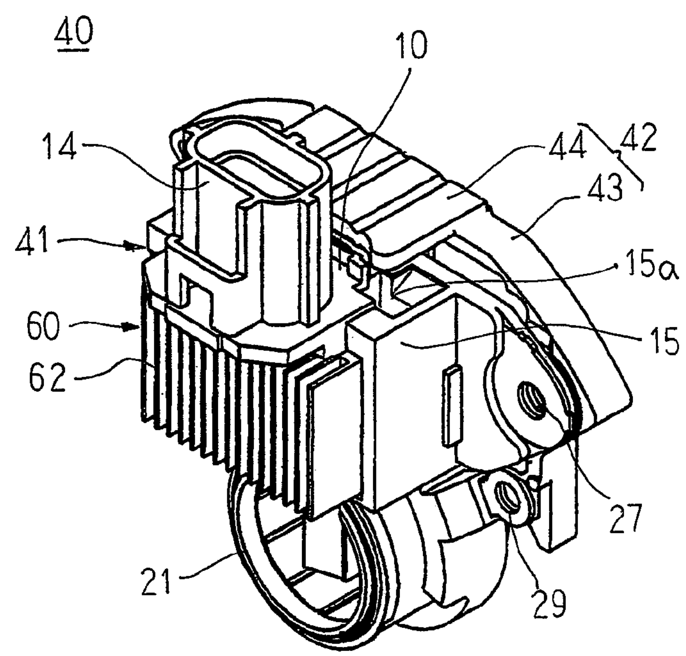
FIG. 3 is a perspective of the regulator assembly that can be used in the automotive alternator according to the preferred embodiment of the present invention.
Figure 4:
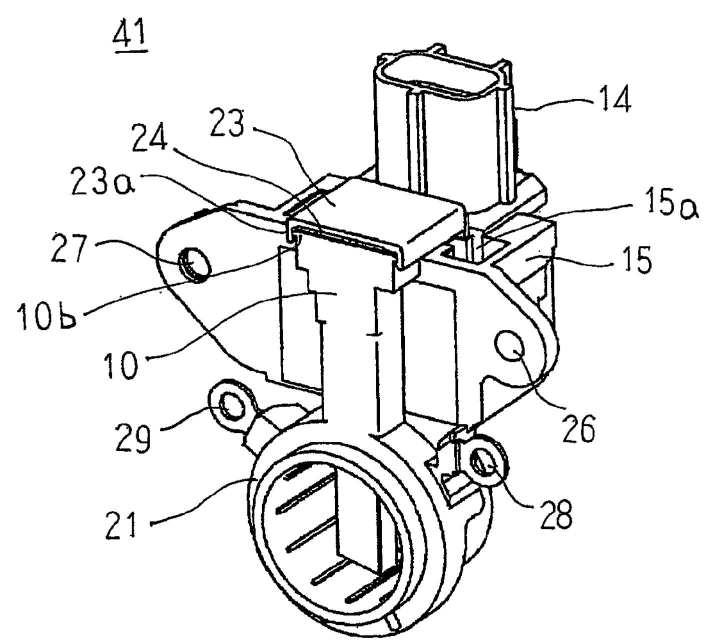
FIG. 4 is a perspective of a base that constitutes a brush holder assembly that can be used in the automotive alternator according to the preferred embodiment of the present invention.
Figure 5:
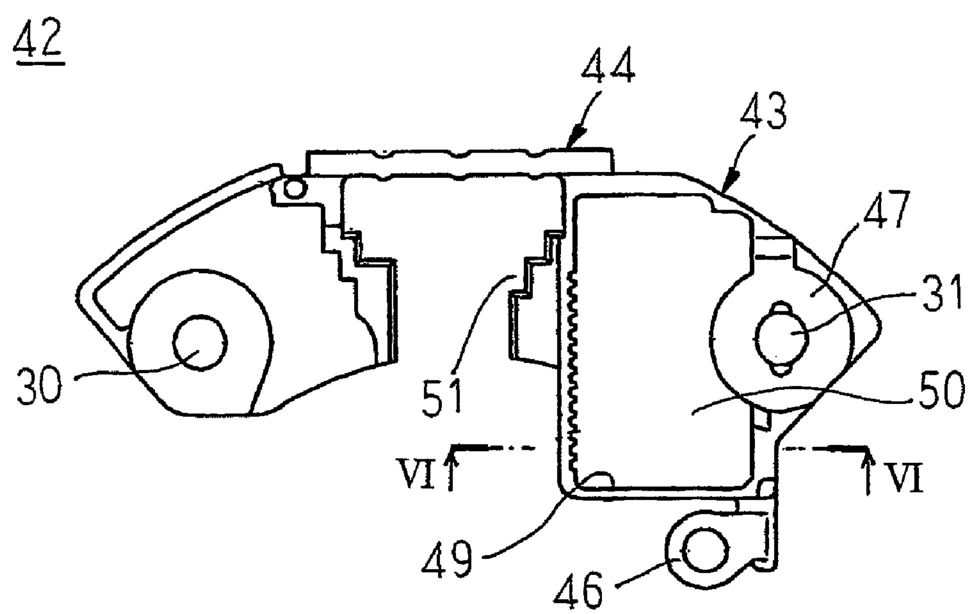
FIG. 5 is a rear elevation of a plate that constitutes the regulator assembly that can be used in the automotive alternator according to the preferred embodiment of the present invention.
Figure 6:
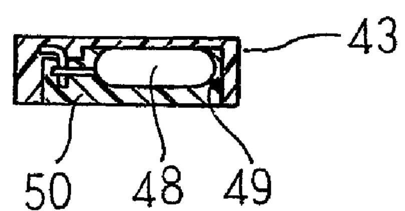
FIG. 6 is a cross section that is taken along line VI-VI in FIG. 5 so as to be viewed in the direction of the arrows.

Next, configuration of a regulator assembly 40 will be explained with reference to FIGS. 2 through 6. FIG. 2 is a front elevation, a top plan and a right side elevation of a regulator assembly that can be used in the automotive alternator according to the preferred embodiment of the present invention, FIG. 3 is a perspective of the regulator assembly, and FIG. 4 is a perspective of a base that constitutes a brush holder assembly. FIG. 5 is a rear elevation of a plate that constitutes the regulator assembly, and FIG. 6 is a cross section that is taken along line VI-VI in FIG. 5 so as to be viewed in the direction of the arrows.

The regulator assembly 40 includes: a base 41 into which the brush holder portion 10, the connector portion 14, a regulator circuit board housing portion 15, and a hollow cylindrical slinger portion 21 are molded integrally using a polyphenylene sulfide (PPS) resin, for example; and a plate 42 that can be removably mounted onto the brush holder portion 10. Here, because a central axis of the slinger portion 21 is aligned with a central axis of the rotating shaft 4, a direction that is perpendicular to the central axis of the slinger portion 21 will be called a radial direction.

The brush holder portion 10 is disposed so as to extend radially from an outer circumferential surface of the slinger portion 21. Brush insertion apertures 10*a* are formed on the brush holder portion 10 so as to be separated in an axial direction of the slinger portion 21 and so as to face inside the slinger portion 21. The regulator circuit board housing portion 15 is disposed so as to overlap with and be adjacent to the brush holder portion 10 at a first end of the brush holder portion 10 in the axial direction of the slinger portion 21. The connector portion 14 is disposed so as to be adjacent to the regulator circuit board housing portion 15 radially outside the regulator circuit board housing portion 15 such that an opening portion 14*a* faces radially outward. Respective center lines of the brush holder portion 10, the connector portion 14, and the regulator circuit board housing portion 15 are positioned in a common plane that passes through the central axis of the slinger portion 21, i.e., the central axis of the rotating shaft 4. Ventilating apertures 41*a* are disposed through the base 41 radially inside the regulator circuit board housing portion 15 on a first circumferential side of the brush holder portion 10.

A circuit board heatsink 60 is made of a good thermally conducting material such as aluminum, etc., for example, and has: a flat, rectangular base portion 61; and a plurality of fins 62 that are disposed so as to project vertically from a front surface of the base portion and that are arranged so as to be parallel to each other. The regulator circuit board 13 is fixed to a rear surface of the base portion 61 of the circuit board heatsink 60 using adhesive, etc., and is housed and held inside the regulator circuit board housing portion 15 from an opening of the regulator circuit board housing portion 15 at a first axial end of the slinger portion 21 such that the fins 62 face the rear bracket 2. Here, ventilation channels that are formed between adjacent fins 62 extend radially parallel to one surface of the base portion 61. An insulating resin is injected so as to fill the regulator circuit board housing portion 15 through a resin injection aperture 15*a* that is open on a radially outer side of the regulator circuit board housing portion 15. The brushes 11 are inserted into the respective brush insertion apertures 10*a* of the brush holder portion 10, and are pressed toward the slinger portion 21 by forces from springs 25.

Caps that close the brush insertion apertures 10*a* are configured so as to have a two-layer construction that is constituted by a resin cap 23 and the rubber cap 24. The resin cap 23 is mounted by fitting two end recess portions 23*a* thereof from a radially upper end portion of the brush holder portion 10 into flange portions 10*b* that are disposed so as to protrude from two circumferential sides of the brush holder portion 10. The rubber cap 24 is fixed to an inner surface of the resin cap 23 and closes the respective brush insertion apertures 10*a*. Penetrating apertures 26 and 27 are disposed through portions of the base 41 on two sides of the brush holder portion 10, and electrode terminal portions 28 and 29 are also formed so as to be exposed from the base 41 radially outside the slinger portion 21.

The plate 42 is molded using a PPS resin, for example, and has: a straightening vane portion 43 that has a front surface that is a flat surface; and a cover portion 44 that is disposed so as to extend at a right angle from the straightening vane portion 43 and that approximately covers the resin injection aperture 15*a* of the regulator circuit board housing portion 15.

First ends of insert conductors that are insert molded into the plate 42 are exposed from the straightening vane portion 43 so as to form electrode terminal portions 46 and 47, and second ends project into a capacitor housing portion 49 that is recessed into a rear surface of the straightening vane portion 43. A noise-preventing capacitor 48 is connected to the end portions of the insert conductors that project into the capacitor housing portion 49, and is housed inside the capacitor housing portion 49. A filler resin 50 is injected into the capacitor housing portion 49 so as to embed the capacitor 48. In addition, penetrating apertures 30 and 31 are disposed through the straightening vane portion 43 at positions that correspond to the penetrating apertures 26 and 27 on the base 41.

An interfitting portion 51 that fits together with the brush holder portion 10 is formed so as to have a partially stepped internal shape that conforms to an external shape of the radially upper end portion of the brush holder portion 10 in a vicinity of a root base portion of the cover portion 44 of the straightening vane portion 43. The plate 42 is mounted to the base 41 by fitting the interfitting portion 51 over the brush holder portion 10. The cover portion 44 thereby presses an upper end surface of the resin cap 23 so as to prevent the resin cap 23 from dislodging. The brush holder portion 10 and the straightening vane portion 43 are positioned approximately in a common plane so as to constitute a generally flat surface.

Figure 7A:
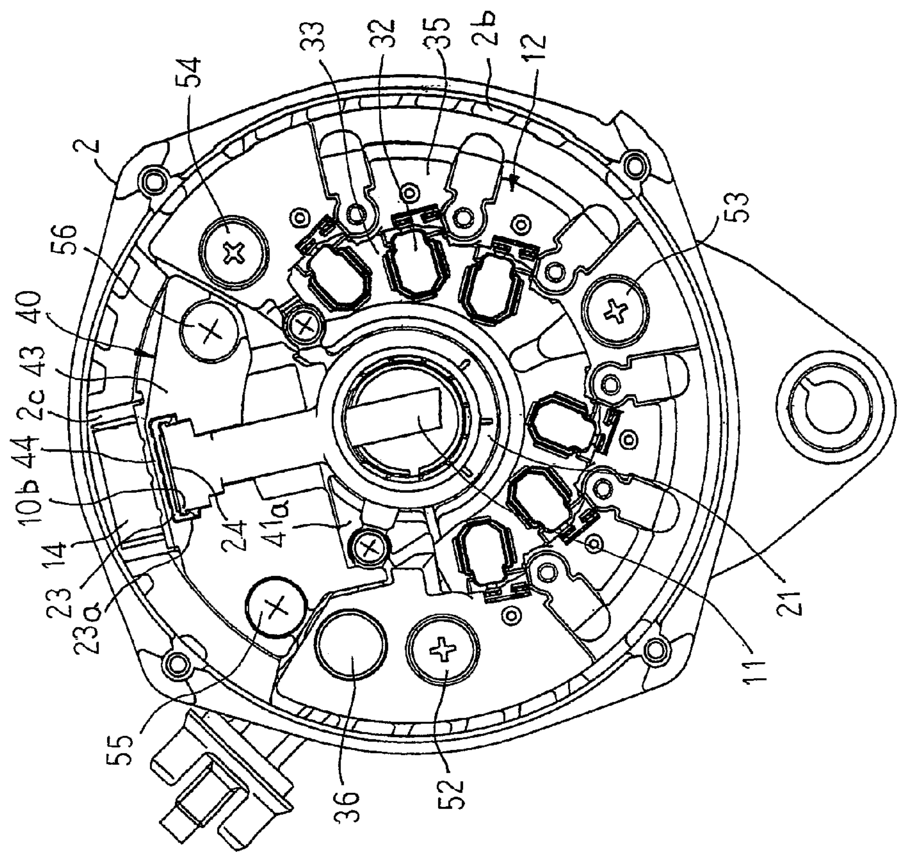
FIGS. 7A and 7B are views that show a mounted state of a rectifier and the regulator assembly that can be used in the automotive alternator according to the preferred embodiment of the present invention.
Figure 7B:
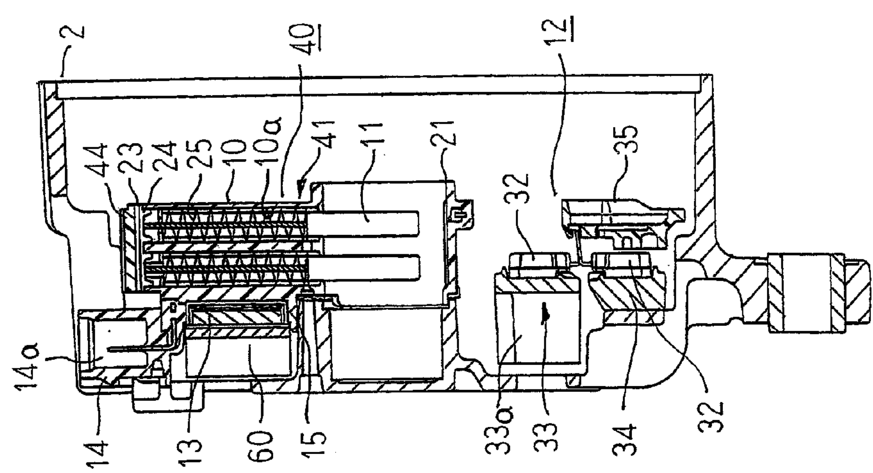
Figure 8:
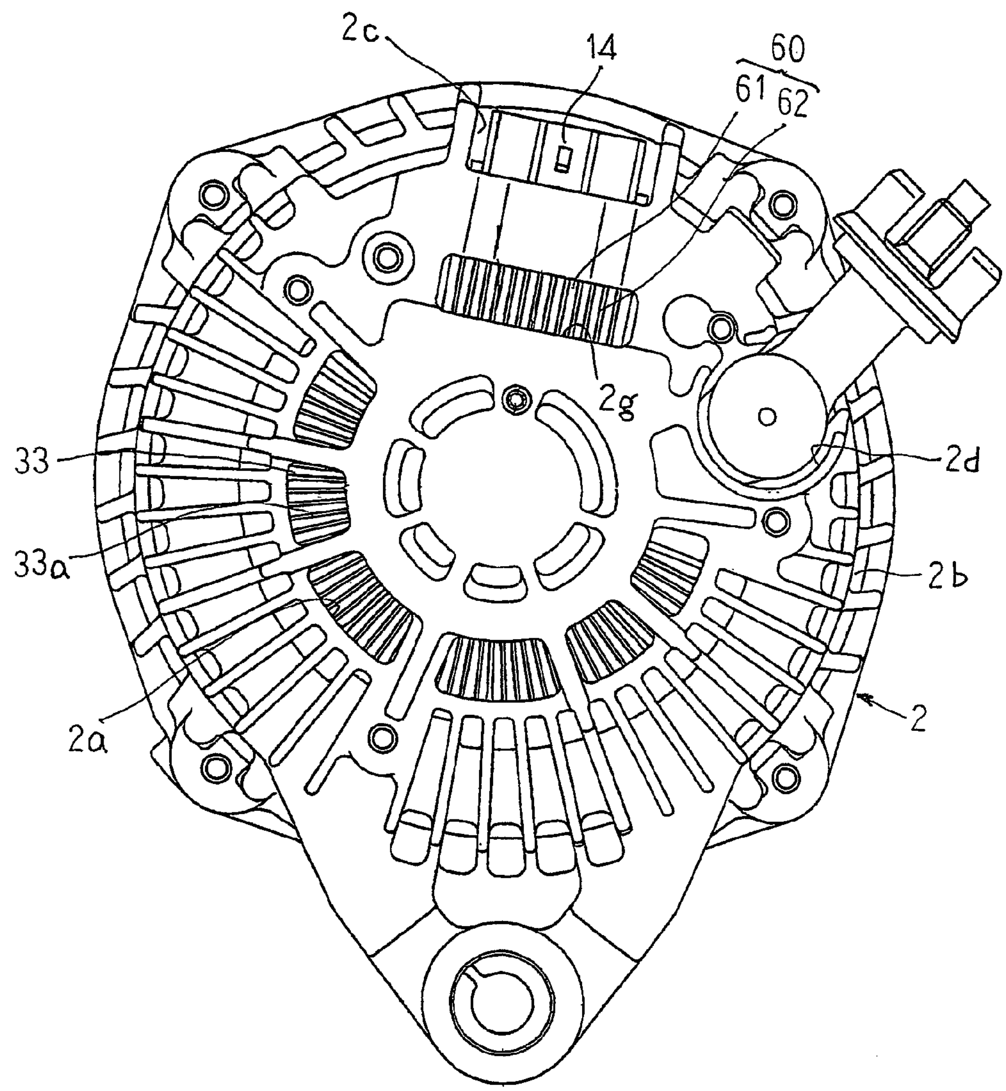
FIG. 8 is a rear-end elevation of the automotive alternator according to the preferred embodiment of the present invention.
Figure 9:
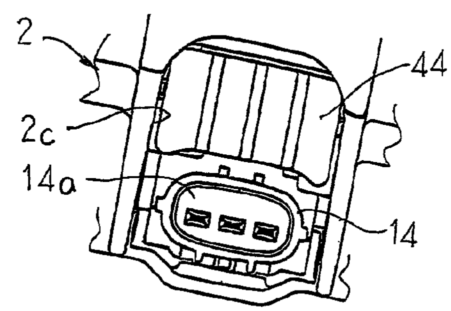
FIG. 9 is a top plan of a vicinity of a lead opening in the automotive alternator according to the preferred embodiment of the present invention.

Next, a mounted state of the rectifier 12 and the regulator assembly 40 will be explained. FIGS. 7A and 7B are views that show a mounted state of a rectifier and the regulator assembly that can be used in the automotive alternator according to the preferred embodiment of the present invention, FIG. 7A showing a front elevation thereof and FIG. 7B showing a cross section thereof. FIG. 8 is a rear-end elevation of the automotive alternator according to the preferred embodiment of the present invention, FIG. 9 is a top plan of a vicinity of a lead opening in the automotive alternator according to the preferred embodiment of the present invention, and FIG. 10 is a front elevation that shows a mounted state of the rectifier in the automotive alternator according to the preferred embodiment of the present invention.

As shown in FIG. 7, the rectifier 12 is assembled by mounting a plurality of diodes 32 onto approximately C-shaped first and second heatsinks 33 and 34, disposing the first and second heatsinks 33 and 34 concentrically in a common plane, and stacking an approximately C-shaped circuit board 35 on the second heatsink 34. The diodes 32 that are mounted onto the heatsinks 33 and 34 are connected so as to constitute a rectifier circuit by means of a circuit board 35. A B terminal bolt 36 that constitutes an output terminal of the rectifier 12 is held by press-fitting a knurl into the first heatsink 33. Insert conductors also extend outward from the circuit board 35 so as to constitute electrode terminal portions 37 and 38. A plurality of fins 33*a* are disposed so as to stand in a radial pattern on a rear surface of the first heatsink 33.

Figure 10:
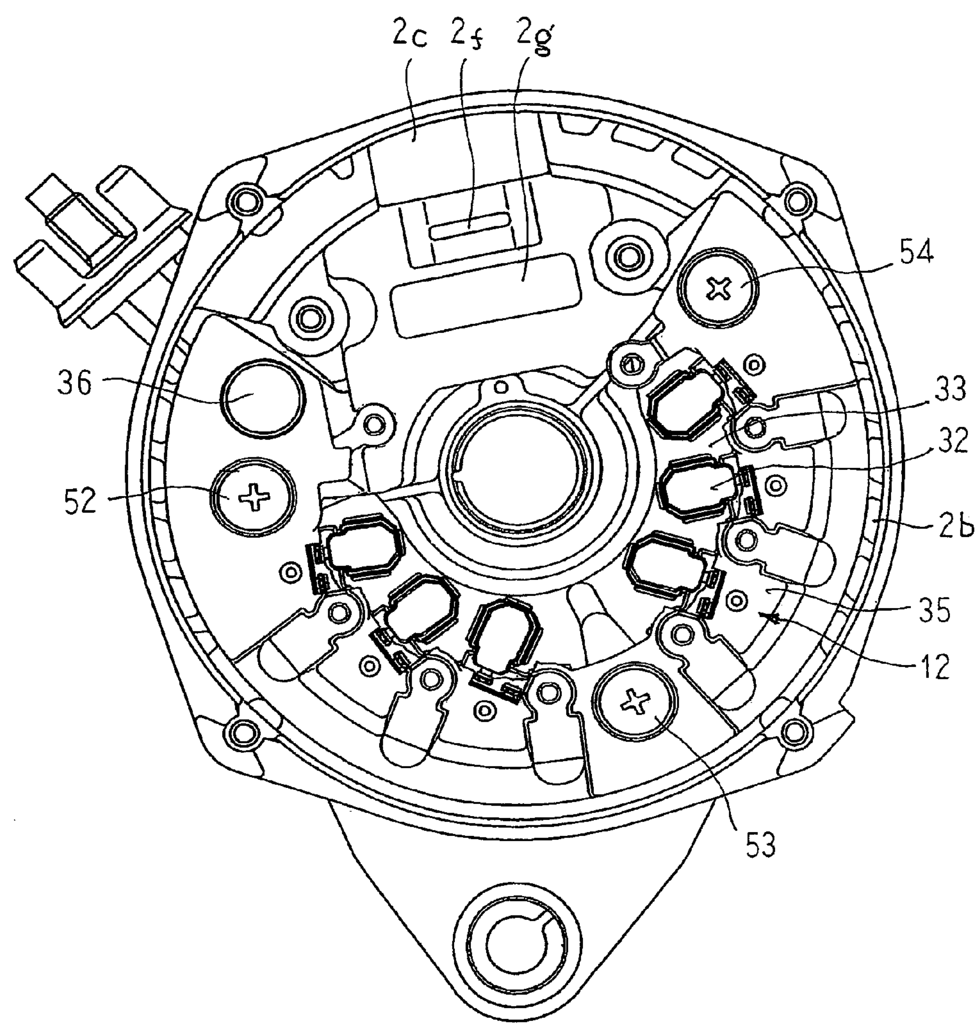
FIG. 10 is a front elevation that shows a mounted state of the rectifier in the automotive alternator according to the preferred embodiment of the present invention.

As shown in FIG. 10, the rectifier 12 is disposed around a central axis of the rear bracket 2 in an approximate C shape (an arc shape), and is fastened to an inner wall surface of the rear bracket 2 by mounting screws 52, 53, and 54. A positioning portion 2*f* for positioning the connector portion 14 is disposed on an inner wall surface of the rear bracket 2 between two end portions of the approximately C-shaped rectifier 12, and large rectangular suction apertures 2*g* are disposed opposite the heatsink 60 of the regulator circuit board 13.

As shown in FIG. 7A, the regulator assembly 40 is disposed between the two end portions of the approximately C-shaped rectifier 12 by aligning the central axis of the slinger portion 21 with the central axis of the rear bracket 2, and is fastened to an inner wall surface of the rear bracket 2 by mounting screws 55 and 56. The front surface of the straightening vane portion 43 is thereby positioned in a common plane with a surface of the rectifier 12 that faces the blades of the rear cooling fan 7*b* so as to constitute a flat annular blade-facing surface.

As shown in FIG. 8, a large number of first suction apertures 2*a* are disposed on an end surface of the rear bracket 2 so as to face the fins 33*a* of the first heatsink 33, and a large number of discharge apertures 2*b* are disposed on side surfaces of the rear bracket 2. A lead opening 2*c* for connecting an external connector to the connector portion 14 and a B terminal lead opening 2*d* are disposed through respective portions of the rear bracket 2. As shown in FIG. 9, a large portion of the lead opening 2*c* is closed over by the cover portion 44 of the plate 42 except for the lead portion of the connector portion 14.

In an automotive alternator that is configured in this manner, air is sucked into the rear bracket 2 through the suction apertures 2*a* and 2*g* due to rotation of the rear cooling fan 7*b*, which operates together with the rotation of the rotor 6.

The air that has been sucked in through the first suction apertures 2*a* flows radially inward along the radial fins 33*a* of the first heatsink 33, and flows toward the rotor 6 along a central axis from an inner circumferential edge of the first heatsink 33. The air that has flowed toward the rotor 6 is deflected centrifugally by the rear cooling fan 7*b*, cools the coil ends 20, and is discharged externally through the discharge apertures 2*b*.

The air that has been sucked in through the rectangular suction apertures 2*g* flows radially inward along the fins 62 of the circuit board heatsink 60, which extend radially, passes through the ventilating apertures 41*a* from an inner circumferential edge of the circuit board heatsink 60, and flows along the central axis toward the rotor 6. The air that has flowed toward the rotor 6 is deflected centrifugally by the rear cooling fan 7*b*, cools the coil ends 20, and is discharged externally through the discharge apertures 2*b*.

Temperature increases in the diodes 32 of the rectifier 12 and power transistors of the regulator circuit board 13, which constitute heat sources, are suppressed by heat exchange between the air that flows along the fins 33*a* and 62 of the first and circuit board heatsinks 33 and 60 and the first and circuit board heatsinks 33 and 60. Heat that is generated by the diodes 32 that are mounted to the second heatsink 34 is also transferred directly to the rear bracket 2 from the second heatsink 34 and is radiated from a front surface of the rear bracket 2, suppressing temperature increases in the diodes 32.

Figure 11:
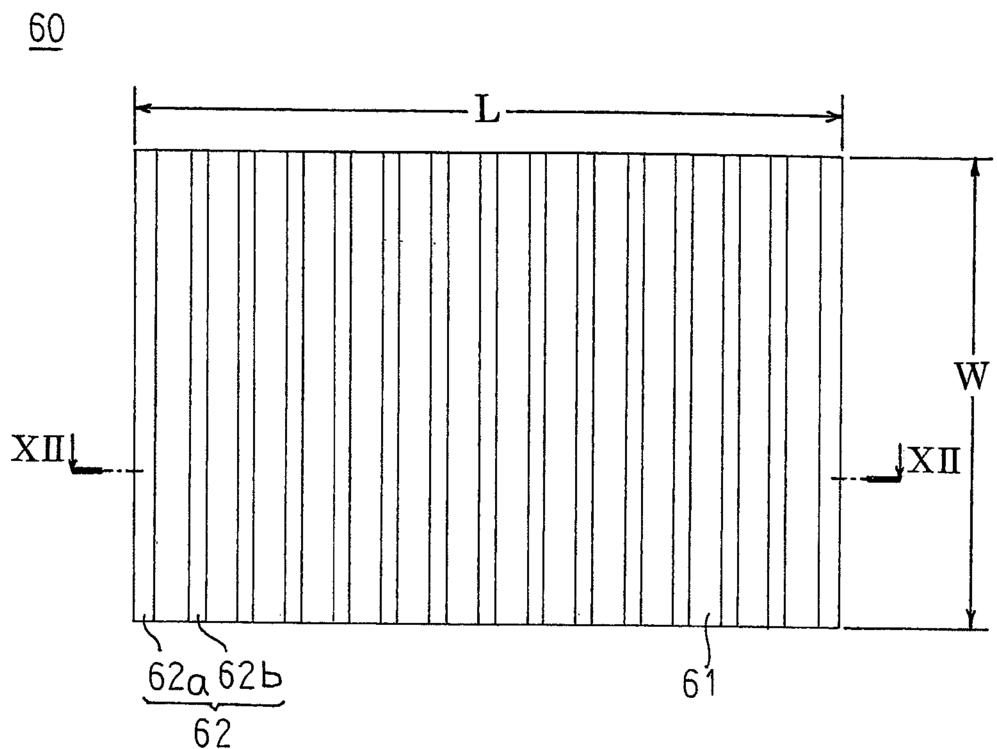
FIG. 11 is a front elevation of a regulator circuit board heatsink in the automotive alternator according to the preferred embodiment of the present invention.

Next, fin construction in the circuit board heatsink 60 will be explained. FIG. 11 is a front elevation of a regulator circuit board heatsink in the automotive alternator according to the preferred embodiment of the present invention, and FIG. 12 is a cross section that is taken along line XII-XII in FIG. 11 so as to be viewed in the direction of the arrows.

Figure 12:
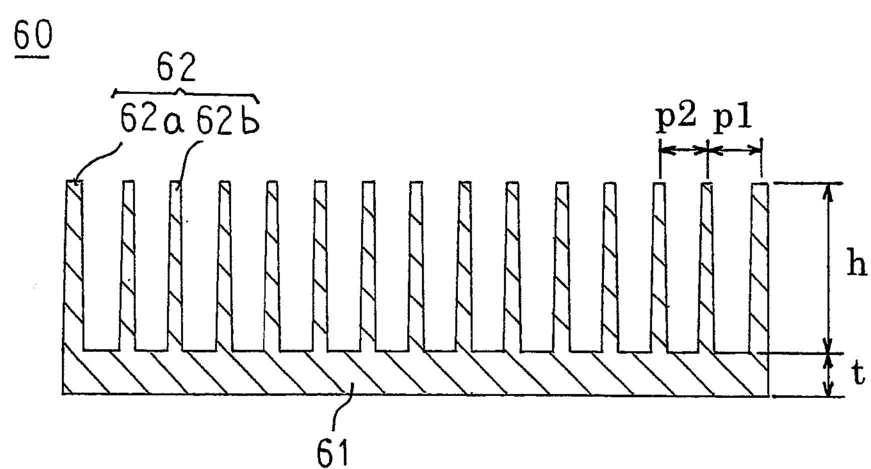
FIG. 12 is a cross section that is taken along line XII-XII in FIG. 11 so as to be viewed in the direction of the arrows.

In FIGS. 11 and 12, the heatsink 60 has: a base portion 61 that has a width (W) of 22 mm, a length (L) of 33 mm, and a thickness (t) of 2 mm; and fifteen fins 62 that are disposed so as to project vertically from a front surface of the base portion 61 and that are arranged parallel to each other. The respective fins 62 are disposed on the front surface of the base portion 61 so as to extend from a first end to a second end in a width direction, and are arranged so as to have a predetermined clearance in a longitudinal direction. The respective fins 62 are formed so as to have a tapered shape that gradually becomes slenderer from a root end portion toward a tip end. Two first fins 62*a* that are positioned at two ends have a root end thickness of 0.90 mm, a tip end thickness of 0.70 mm, and a projecting height (h) of 8.00 mm, and thirteen remaining second fins 62*b* have a root end thickness of 0.75 mm, a tip end thickness of 0.50 mm, and a projecting height (h) of 8.00 mm. A center line pitch (p1) between adjacent first and second fins 62*a* and 62*b* is 2.55 mm, and an array pitch (p2) between the second fins 62*b* is 2.25 mm. A circuit board heatsink 60 that is configured in this manner is prepared by extruding aluminum.

Figure 13:
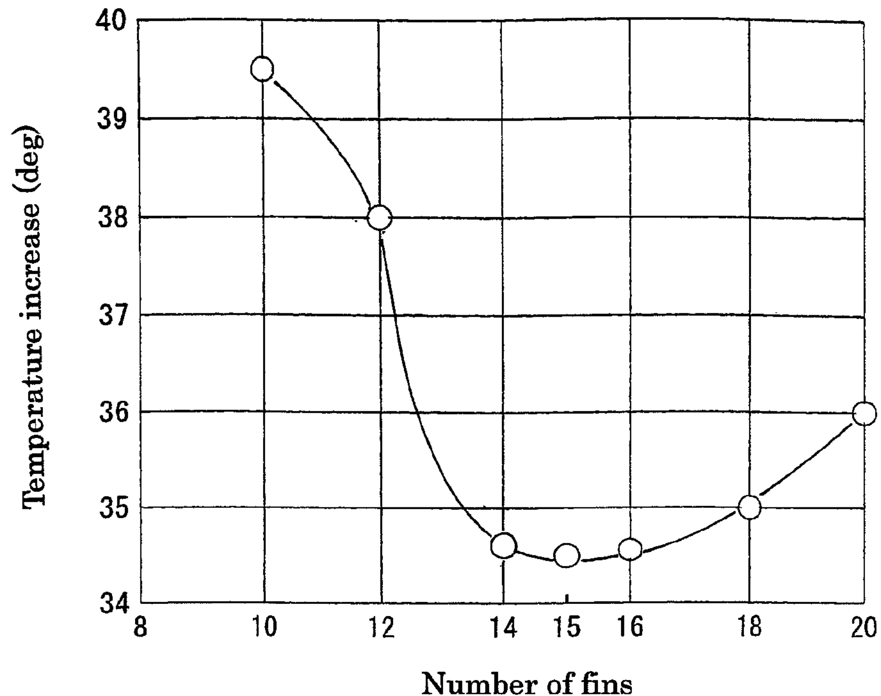
FIG. 13 is a graph of a relationship between temperature increase and the number of fins in the regulator circuit board heatsink in the automotive alternator according to the preferred embodiment of the present invention.

Now, heatsinks 60 were prepared such that only the number of second fins 62*b* that are arranged between the first fins 62*a* that are disposed so as to stand at the two longitudinal ends of the base portion 61 was changed, the circuit board heatsinks 60 were installed in an automotive alternator, temperature (saturation temperature) of the circuit board heatsinks 60 after being operated for thirty minutes under conditions described below was measured, and results thereof are shown in FIG. 13. Moreover, the number of fins on the horizontal axis is the total number of first and second fins 62*a* and 62*b*.

Operating conditions:

Load: full load

Rotational speed: rotational speed at which temperature in the regulator circuit was maximized Ambient temperature: 20° C.

Adjusted voltage: 13.5 V

As can be seen from FIG. 13, results were obtained that showed that the temperature of the circuit board heatsink 60 decreases rapidly when the number of fins is increased from ten, and the temperature of the circuit board heatsink 60 decreases gently when the number of fins is greater than or equal to fourteen. Results were obtained that showed that the temperature of the circuit board heatsink 60 is lowest when the number of fins is fifteen, and the rate of temperature increase in the circuit board heatsink 60 increases when the number of fins exceeds sixteen.

Figure 14:
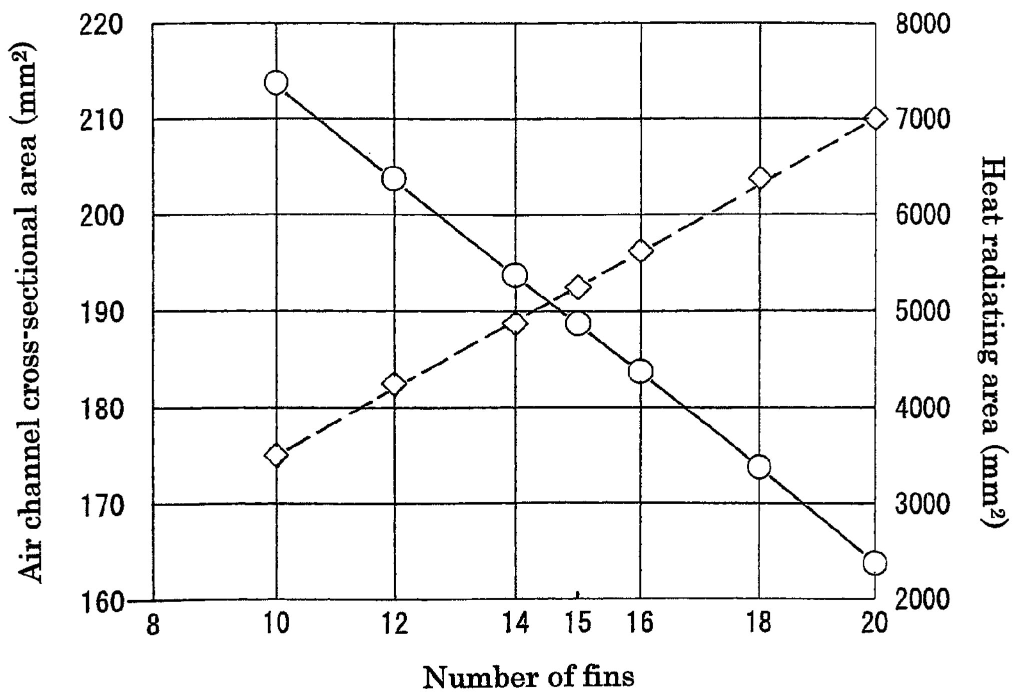
FIG. 14 is a graph of relationships between air channel cross-sectional area and the number of fins and between heat radiating area and the number of fins in the regulator circuit board heatsink in the automotive alternator according to the preferred embodiment of the present invention.

It can also be seen that the heat radiating area of a heatsink increases in proportion to the number of fins, as indicated by the broken line in FIG. 14. On the other hand, it can be seen that the air channel cross-sectional area of a heatsink decreases in proportion to the number of fins, as indicated by the solid line in FIG. 14.

It can thus be inferred that the temperature of the circuit board heatsink 60 decreased rapidly as the number of fins was increased from ten because improvements in heat radiation from the fins 62 due to increases in heat radiating area became more pronounced. When the number of fins reaches fourteen, wind loss that results from reductions in air channel cross-sectional area increases, reducing airflow rates. Thus, it can be inferred that improvements in heat radiation from the fins 62 due to increases in heat radiating area are reduced by decreases in airflow rate that result from wind loss, reducing the rate of temperature reduction in the circuit board heatsink 60. It can also be inferred that the temperature of the circuit board heatsink 60 increased when the number of fins exceeded fifteen because deterioration in heat radiation from the fins 62 due to decreases in airflow rate that result from wind loss exceeded improvements in heat radiation from the fins 62 due to increases in heat radiating area.

From the above, it can be seen that good cooling performance can be achieved by setting the number of fins in a range from fourteen to sixteen, and better cooling performance can be achieved by setting the number of fins to fifteen, in particular.

According to the present invention, because the number of fins 62 is set to fifteen, heat that is generated in the power transistors of the regulator circuit board 13 is transferred to the circuit board heatsink 60, and is radiated from the fins 62 effectively, enabling temperature increases in the power transistors to be suppressed.

Because the large suction apertures 2*g* are disposed through the rear bracket 2 so as to face the circuit board heatsink 60, a large quantity of external air is supplied to the circuit board heatsink 60 directly, further enabling temperature increases in the power transistors to be suppressed.

Because the first fins 62*a*, which are disposed at first and second longitudinal end positions of the circuit board heatsink 60, are prepared so as to be thicker than the second fins 62*b*, which are disposed between the first fins 62*a*, the strength of the first fins 62*a* that are positioned at the end portions of the circuit board heatsink 60 is increased, enabling fin collapse, etc., that could occur during cleaning of the circuit board heatsink 60 to be prevented.

Because the fins 62 are prepared so as to have a tapered shape, weight reductions can be achieved in the circuit board heatsink 60.

Because the first and second fins 62*a* and 62*b* are prepared so as to have identical heights, yield can be increased in the extrusion of the circuit board heatsink 60.

Yield can also be increased in the extrusion of the circuit board heatsink 60 because the second fins 62*b* are arranged between the first fins 62*a* at a uniform pitch.

Because the brush holder portion 10, the regulator circuit board housing portion 15, and the connector portion 14 are formed such that their respective center lines are positioned in a common plane that includes the central axis of the rotating shaft 4, exclusive circumferential space for the regulator assembly 40 can be reduced. Thus, exclusive circumferential space for the rectifier 12 that is disposed in a common plane with the central axis of the regulator assembly 40 that is perpendicular to the rotating shaft 4 can be increased, enabling the heat radiating area of the first and second heatsinks 33 and 34 to be enlarged, thereby enabling heat that is generated by the diodes 32 to be radiated effectively. Because the heat radiating area of the circuit board heatsink 60 is not reduced at all, cooling of the power transistors of the regulator circuit board 13 does not deteriorate.

Because the straightening vane portion 43 functions together with the rectifier 12 and the brush holder portion 10 to constitute a flat annular blade-facing surface that faces the blades of the rear cooling fan 7*b*, the occurrence of magnetic noise that results from rotation of the rear cooling fan 7*b* is suppressed.

Because the connector portion lead opening 2*c* that leads the connector portion 14 out is mostly closed over by the connector portion 14 and the cover portion 44, penetration of water, dust, etc., into the rear bracket 2 from outside is suppressed. In addition, because the resin injection aperture 16*a* is not exposed externally through the connector portion lead opening 2*c* by the cover portion 44, the penetration of water, dust, etc., into the regulator circuit board housing portion 15 through the resin injection aperture 16*a* is also suppressed.

Because the connector portion 14 projects radially outward, the regulator assembly 40 can be mounted into the rear bracket 2 easily.

Because the ventilating apertures 41*a* are formed so as to pass axially through the regulator assembly 40 radially outside the slinger portion 21, the cooling airflows that have flowed radially inward along the fins 62 of the circuit board heatsink 60 flow through the ventilating apertures 41*a* toward the rotor 6, reducing pressure loss.

Moreover, in the above embodiment, the connector portion 14 projects radially through the rear bracket 2 such that the opening portion 14*a* faces radially outward, but a connector portion may also be prepared so as to project axially through the rear bracket such that the opening portion faces axially. In that case, radial dimensions of the regulator assembly can be reduced.

What is claimed is:

1. An automotive alternator comprising:

a rotor that is fixed to a rotating shaft;

a front bracket and a rear bracket that rotatably support said rotating shaft and that envelop said rotor;

a stator that is held by said front bracket and said rear bracket and that surrounds said rotor;

a rectifier that is mounted to said rear bracket so as to be disposed around said rotating shaft in an approximate C shape and that rectifies alternating-current output that is generated by said stator into direct current;

a regulator assembly comprising a base into which a brush holder portion and a regulator circuit board housing portion are molded integrally such that said regulator circuit board housing portion is disposed to overlap said brush holder portion in an axial direction of said rotating shaft:

wherein the brush holder portion is disposed to face said rotor such that an aperture direction of a brush insertion aperture is aligned in a radial direction and that holds a brush inside said brush insertion aperture, said regulator circuit board housing portion is disposed such that a resin injection aperture faces radially outward, and said regulator assembly is mounted to said rear bracket such that said base is disposed between two end portions of said approximate C shape of said rectifier;

a heat sink comprising:

a flat base portion; and a plurality of fins that are respectively disposed so as to project vertically from a first surface of said base portion and that are arranged to be parallel to each other; and a regulator circuit board fixed to a second surface of said base portion of said heatsink, said regulator circuit board housed and held inside said regulator circuit board housing portion such that said fins face said rear bracket and adjusts magnitude of an alternating-current voltage that is generated by said stator, wherein said fins that are formed on said first surface of said base portion are within a range from fourteen to sixteen in number.

2. An automotive alternator according to claim 1, wherein said fins are fifteen in number.

3. An automotive alternator according to claim 1, wherein two of said fins that are positioned at two ends in a direction of fin arrangement are formed so as to be thicker than the others.

4. An automotive alternator according to claim 1, wherein each of said fins is formed so as to have a tapered shape that gradually becomes slenderer from a root end portion toward a tip end.

5. An automotive alternator according to claim 1, wherein said fins are formed so as to have projecting heights from said first surface of said base portion that are equal to each other.

6. An automotive alternator according to claim 1, wherein the fins positioned between two of said fins that are positioned at two ends in a direction of fin arrangement are arranged at a uniform pitch.

7. An automotive alternator according to claim 1, wherein ventilation channels that are formed between adjacent fins extend radially so as to be parallel to said first surface of said base portion, and ventilating apertures are formed radially inside said regulator circuit board housing portion so as to pass axially through said base.

8. An automotive alternator according to claim 1, further comprising a connector portion that is molded integrally into said base, wherein said brush holder portion, said regulator circuit board housing portion, and said connector portion are positioned such that respective center lines thereof are in a common plane that includes a central axis of said rotating shaft.

9. An automotive alternator according to claim 8, wherein said connector portion is disposed so as to be adjacent to a radially outer side of said regulator circuit board housing portion.

10. An automotive alternator according to claim 9, wherein said connector portion projects radially outward.

* * * * *